US010824688B2

(12) United States Patent
Castillo et al.

(10) Patent No.: US 10,824,688 B2
(45) Date of Patent: *Nov. 3, 2020

(54) SYSTEM, METHOD, AND COMPUTER PROGRAM PRODUCT FOR GENERATION OF LOCAL CONTENT CORPUS

(71) Applicant: Groupon, Inc., Chicago, IL (US)

(72) Inventors: Roger Castillo, Palo Alto, CA (US); Thomas Jack, Austin, TX (US)

(73) Assignee: Groupon, Inc., Chicago, IL (US)

( * ) Notice: Subject to any disclaimer, the term of this patent is extended or adjusted under 35 U.S.C. 154(b) by 445 days.

This patent is subject to a terminal disclaimer.

(21) Appl. No.: 15/397,114

(22) Filed: Jan. 3, 2017

(65) Prior Publication Data

US 2017/0344565 A1 Nov. 30, 2017

Related U.S. Application Data

(63) Continuation of application No. 13/444,691, filed on Apr. 11, 2012, now Pat. No. 9,563,644.

(Continued)

(51) Int. Cl.
*G06F 16/00* (2019.01)
*G06F 16/9537* (2019.01)
(Continued)

(52) U.S. Cl.
CPC .......... *G06F 16/9537* (2019.01); *G06F 16/22* (2019.01); *G06F 16/248* (2019.01);
(Continued)

(58) Field of Classification Search
CPC ...... G06F 16/9537; G06F 16/22; G06F 16/29; G06F 16/58; G06F 16/248; G06F 16/285
See application file for complete search history.

(56) References Cited

U.S. PATENT DOCUMENTS 5,930,474 A 7/1999 Dunworth et al.
6,330,610 B1 * 12/2001 Docter .................. G06F 16/335
709/229

(Continued)

OTHER PUBLICATIONS

Yuan et al., "Category Hierarchy Maintenance: a Data-Driven Approach", SIGIR'12, pp. 791-800, 2012, ACM.

(Continued)

*Primary Examiner* — Tarek Chbouki
(74) *Attorney, Agent, or Firm* — Alston & Bird LLP

(57) ABSTRACT

Various methods for generating a content corpus populated with content related to a particular geographic area are provided herein. One example method comprises, for each document in an initial local content corpus, applying a first set of heuristic filters to the raw content of each document, identifying at least a second term, applying a second set of heuristic filters to the raw content of each document, the second set of heuristic filters associated with the second term, iteratively performing the identification of additional terms and application of an additional set of heuristic filters associated with the additional terms until each identifiable term is extracted, determining a level on a geographic containment hierarchy indicative of a location to which each document from the set of documents is local, and for each place in a gazette, and for each document, determining a set of points in polygons indicative of its locality.

20 Claims, 6 Drawing Sheets

Related U.S. Application Data

(60) Provisional application No. 61/474,095, filed on Apr. 11, 2011.

(51) Int. Cl.

| | | |
|---|---|---|
| *G06F 16/22* | (2019.01) | |
| *G06F 16/29* | (2019.01) | |
| *G06F 16/58* | (2019.01) | |
| *G06F 16/248* | (2019.01) | |
| *G06F 16/28* | (2019.01) | |

(52) U.S. Cl.
CPC .......... *G06F 16/285* (2019.01); *G06F 16/29* (2019.01); *G06F 16/58* (2019.01)

(56) References Cited

U.S. PATENT DOCUMENTS

| | | | |
|---|---|---|---|
| 7,231,405 | B2 | 6/2007 | Xia |
| 7,426,290 | B1 | 9/2008 | Khan et al. |
| 7,822,705 | B2 | 10/2010 | Xia |
| 8,386,506 | B2 | 2/2013 | Martinez et al. |
| 9,384,211 | B1 | 7/2016 | Castillo et al. |
| 9,563,644 | B1 | 2/2017 | Castillo et al. |
| 2004/0078750 | A1* | 4/2004 | Frank ............... G06F 16/9537 715/256 |
| 2006/0142027 | A1 | 6/2006 | Krishnamurthi et al. |
| 2007/0094221 | A1* | 4/2007 | Au ..................... G06F 17/2785 706/55 |
| 2007/0198495 | A1* | 8/2007 | Buron ............... G06F 16/9537 |
| 2007/0233864 | A1* | 10/2007 | Xie ......................... H04L 67/18 709/226 |
| 2007/0288437 | A1 | 12/2007 | Xia |
| 2008/0154888 | A1* | 6/2008 | Buron ............... G06F 16/9537 |
| 2008/0319974 | A1* | 12/2008 | Ma ......................... G06F 16/29 |
| 2009/0006316 | A1 | 1/2009 | Fan et al. |
| 2009/0125505 | A1 | 5/2009 | Bhalotia et al. |
| 2011/0106534 | A1 | 5/2011 | LeBeau et al. |
| 2011/0271232 | A1* | 11/2011 | Crochet ............ G06F 17/2211 715/810 |
| 2011/0282508 | A1* | 11/2011 | Goutard .................. H02J 3/06 700/293 |
| 2011/0299422 | A1 | 12/2011 | Kim et al. |

OTHER PUBLICATIONS

Ye et al., "iSurfer: A Focused Web Crawler Based on Incremental Learning from Positive Samples", APWeb 2004, LNCS 3007, pp. 122-134, 2004, Springer-Verlag Berlin Heilelberg.

Woodward, "Extraction and Visualization of Temporal Information and Related Named Entities from Wikipedia", Springs, pp. 1-8,2001.

Web site page entitled tf*idf, Wikipedia, last modified on Feb. 8, 2012 downloaded from <http://en.wikipedia.org/wiki/Tf%E2%80%93idf> and printed on Feb. 10, 2012, 4 pgs.

Web site page entitled "Osm2pgsql/schema", Wikipedia, last modifed on Mar. 1, 2012 downloaded from <http://en.wiki.openstreetmap.org/wiki/osm2pgsql/schema> and printed on Mar. 21, 2012, 4 pgs.

Web site page entitled "OpenStreetMap", Wikipedia, last modified on Mar. 10, 2012 downloaded from <http://en.wikipedia.org/wiki/Openstreetmap> and printed Mar. 21, 2012, 13 pgs.

Vaid et al., "Spatio-textual Indexing for Geographical Search on the Web", Lecture Notes in Computer Science vol. 3633, pp. 218-235, 2005, Springer Berlin Heidelberg.

TeleNav; "TeleNav Launches Navigation-Based Mobile Advertising Platform"; http://www.telenav.com/about/pr/pr-20100914.html; 2 pages.

Tang et al., "Acclimatizing Taxonomic Semantics for Hierarchical Content Classification", KDD'06, pp. 384-393, 2006, ACN.

He et al., "Automatic Maintenance of the Category Hierarchy", 2013 Ninth International Conference on Semantics, Knowledge and Grids, pp. 218-221,2014, IEEE.

Alves et al., "Place Enrichment by Mining the Web", Lecture Notes in Computer Science, vol. 5859, pp. 66-77, 2009, Springer Berlin Heidelberg.

\* cited by examiner

SYSTEM, METHOD, AND COMPUTER PROGRAM PRODUCT FOR GENERATION OF LOCAL CONTENT CORPUS

CROSS-REFERENCE TO RELATED APPLICATIONS

This is a conversion of and claims a benefit of priority from U.S. Provisional Application No. 61/474,095, filed Apr. 11, 2011, entitled "SYSTEM, METHOD, AND COMPUTER PROGRAM PRODUCT FOR AUTOMATED DISCOVERY, CURATION AND EDITING OF ONLINE LOCAL CONTENT," which is fully incorporated herein by reference. This application relates to U.S. patent application Ser. No. 13/444,678 filed Apr. 11, 2012, entitled "SYSTEM, METHOD, AND COMPUTER PROGRAM PRODUCT FOR AUTOMATED DISCOVERY, CURATION AND EDITING OF ONLINE LOCAL CONTENT," which is also fully incorporated herein by reference.

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNICAL FIELD

This disclosure relates generally to online search and social media. More particularly, embodiments disclosed herein relate to a system, method, and computer program product for generating local content corpora.

BACKGROUND OF THE RELATED ART

Social media and Internet technologies have enabled any computer user, local organizations and small business to easily publish content. Blogging, Twitter and Facebook have become the main channels for user content publication. Local organizations, libraries and local businesses have transitioned their communications from physical media: newspapers, physical bulletin boards, fliers and Yellow Pages to informational websites and more recently social media outlets to attempt to connect with their audiences.

Although information publication has become relatively easy due to web-publication technologies, reaching geographically local users continues to be difficult due to the content discovery mechanism driven by Internet search engines.

A search engine indexes, collects, parses, and stores data to facilitate fast access and relevant information retrieval. Search engines incorporate interdisciplinary concepts from linguistics, cognitive psychology, mathematics, informatics, physics, and computer science.

Today, leading search engine providers use a variety of algorithms to index and retrieve information based on user keyword search. To enable a general search service applicable to all web users, these search engines index and rank content based on general mathematical properties, including web page link analysis in order to determine the likely most relevant content based on key words provided by the user. The number of external links to a given web page affects the ranking of the web page within search results. Users are presented content in "rank order" based on the score determined by the search engine's indexing algorithms.

Unfortunately, traditional Internet search must index an extremely large number of web pages and this limits the type of algorithms that can be applied. These algorithms tend to be extremely general and large amounts of content that might be relevant do not appear within given search results, as they are not linked by other sites on the web. Due to the fact content that is highly geographical topical (local content) competes with the entire body of Internet content for rank positioning. In general, the more local the web page, the fewer external links the content is likely to have. For every position lower on the search rank, a user is 10% less likely to click through a link. Content is effectively buried when ranked off the first page of search results.

For example, if user searches for the terms "Italian food", search engines return the set of all ranked content on the Internet of "Italian Food". Recently, search engines have attempted to improve search relevancy by geo-locating users via IP address and narrowing a user's search by adding the user's location context to their searches and providing more geographically targeted search results. This change enables local content to better compete against Internet wide content. However, users still have to "guess" the best search terms when attempting to find local data and the data is presented as a long list of disconnected items. Consequently, there is always room for innovations and improvements.

SUMMARY OF THE DISCLOSURE

Embodiments disclosed herein provide a new system, method, and computer program product for creating one or more local content corpora, each containing documents that are semantically related to each other with respect to a place, geographical space, or the like.

In some embodiments, one or more server machines may be configured to implement a method comprising building a gazette containing a lexicon of at least people, places, and organizations; bootstrapping an initial set of entities for each of the places in the gazette; and creating a local content corpus for each of the places utilizing the initial set of entities.

In some embodiments, there may be many ways to perform the bootstrapping. For example, information obtained from a plurality of sources may be passed through a plurality of heuristics to look for mentions of names, business, places, contexts, etc. Some heuristic filters can be topological and some can be name oriented, place oriented, time oriented, and so on. These heuristics can be adapted for whatever references the system is configured to search and process.

Some content from the sources may have geocodes. Thus, some heuristics can be adapted to utilize geocodes to "vote off" terms found in the content from the sources.

The bootstrapping process may further comprise ascribing the content based on human curated documents that are known to be local to a particular place. This can "tighten the fitting" on the bootstrapped content.

Documents that have been placed in a local content corpus (also referred to herein as a local corpus) may not be ranked relative to the place or to each other. Instead, they may be ranked in real time utilizing a weighting function. For example, in response to a request about a place, documents that have been placed in a local corpus for the place may be ranked based on "local terms" (local entities) in the documents. These "local terms" are deemed to be associated with that particular place relative to the entire body of text outside the place.

The request about the place may come from a browsing application or mobile app running on a client device connected to the one or more server machines. Software running on the one or more server machines may form a query to an indexing engine or search platform. In response to the query, the system may dynamically rank the documents in the local content corpus with respect to search parameters in the query and relative to the place.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices.

Figure 1:
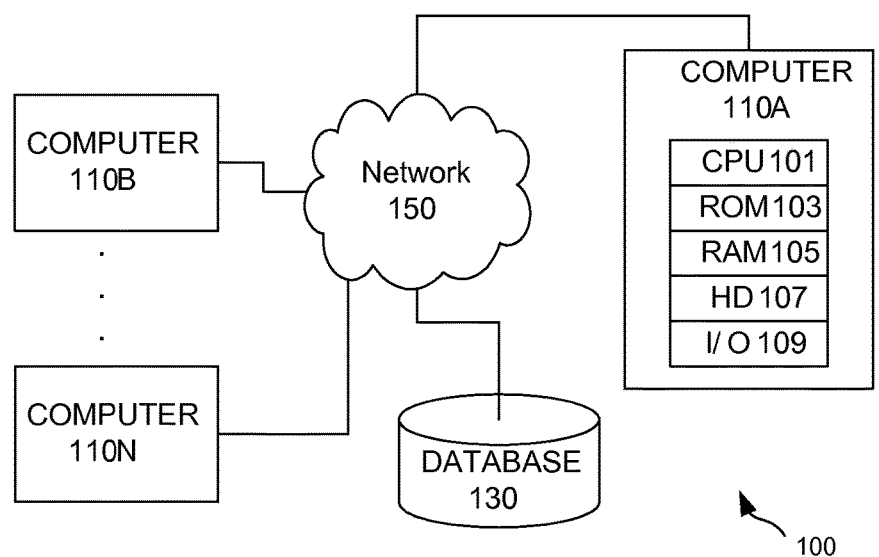
FIG. 1 depicts a diagrammatic representation of a simplified network architecture illustrating an example network environment in which embodiments disclosed herein may be implemented.

Before discussing embodiments of invention, a hardware architecture where embodiments disclosed herein can be implemented is described with reference to FIG. 1. In FIG. 1, network computing environment 100 may comprise network 150. Network 150 can represent a private network, a public network, or a virtual private network (VPN). A company's intranet might be an example of a private network and the Internet might be an example of a public network. A VPN uses primarily public telecommunication infrastructure, such as the Internet, to provide remote users with a way to access an internal network of an organization or entity. Various types of networks are known to those skilled in the art and thus are not further describe Network 150 can be bi-directionally coupled to a variety of networked systems, devices, repositories, etc.

In the simplified configuration shown in FIG. 1, network 150 comprises a plurality of computers and/or machines 110A-N. Computers 110A-N may comprise at least a server machine and a client machine. Virtually any piece of hardware or electronic device capable of running client software and communicating with a server can be considered a client machine. As an example, computer 110A may include a central processing unit (CPU) 101, read-only memory (ROM) 103, random access memory (RAM) 105, hard drive (HD) or non-volatile memory 107, and input/output (I/O) device(s) 109. An I/O device may be a keyboard, monitor, printer, electronic pointing device (e.g., a mouse, trackball, touch pad, etc.), or the like. The hardware configuration of computer 110A can be representative to other devices and computers alike coupled to network 150 (e.g., desktop computers, laptop computers, personal digital assistants, handheld computers, cellular phones, and any electronic devices capable of storing and processing information and network communication). Computer 110B may implement an embodiment of a system disclosed herein and may connect to database 130 and computer 110A via network 150. In some embodiments, database 130 may be accessible by computer 110B locally. For example, database 130 and computer 110B may reside on a private network or a company's intranet. Database 130 may store data used by the system in computing environment 100. In some embodiments, database 130 may reside on computer 110B. In some embodiments, computer 110B may send information to computer 110A over network 150 and computer 110A may operate to present the information to a user of computer 110A.

As one skilled in the art can appreciate, the exemplary architecture shown and described herein with respect to FIG. 1 is meant to be illustrative and not limiting. Further, embodiments disclosed herein may comprise suitable software including computer-executable instructions. As one skilled in the art can appreciate, a computer program product implementing an embodiment disclosed herein may comprise one or more non-transitory computer readable storage media storing computer instructions translatable by one or more processors in computing environment 100. Examples of computer readable media may include, but are not limited to, volatile and non-volatile computer memories and storage devices such as ROM, RAM, HD, direct access storage device arrays, magnetic tapes, floppy diskettes, optical storage devices, etc. In an illustrative embodiment, some or all of the software components may reside on a single computer or on any combination of separate computers.

As discussed above, using the IP geo-locating methodology, online local content can better compete against the entire body of content available on the Internet, but users still have to "guess" the best search terms when attempting to find local data and the data is presented as a long list of disconnected items. Also, due to the low resolution of IP geo-locating, current geographic search results tend to include only city level qualified content, which makes neighborhood or address level search based on a user's current IP address impossible outside the realm of mobile devices.

As many users of the Internet can attest, it is increasingly hard to find content that is relevant or of interest even using the most advanced search engines. One solution involves crowd sourcing in which a task or topic is posted on an online forum or social network and multiple users of that online forum or social network can contribute to the task or topic. One drawback of crowd sourcing is that the task or topic is open to an undefined public. There is little, if any, control by the online forum or social network as to the scope of the overall contributions by these users. Often, there is not a validation mechanism in place to ensure any of the contributions is accurate and/or even relevant.

Recognizing the intrinsic need for local content, embodiments disclosed herein provide a system, method, and computer program product for generating local content corpora. To the extent there is a place or geographic space relevant to a set of content, the system can find and examine it. The opposite can also be true—to the extent there is content relevant to a place or geographic space, the system can find and examine the content. Within this disclosure, a "place" refers to a geographic space or geo point of interest. For example, a place in embodiments disclosed herein can refer to a metropolitan area, a city, or a neighborhood.

Local content is important to how people interacting and shared economy. Today, an average person may spend 90 minutes on their mobile devices per day, consuming a huge quantity of information in terms of data size. However, data can be extremely noisy. Finding content that is relevant to a locality can be a tremendously difficult problem due to the shear variety of web pages, random links to unrelated content, spam and broad social context in which real-time social media is used.

Figure 2:
FIG. 2 depicts a map of the continental United States at night, with a "local web" around each of a plurality of metropolitan areas.

FIG. 2 provides a useful visual for this problem. In FIG. 2, a satellite photo shows a continental United States at night, with clusters of lights around metropolitan areas. At this scale, however, lots of useful information local to a place, say, a neighborhood called Tarrytown in Austin, Tex., cannot be found. They are either "drowned out" by other noises or omitted all together. Consequently, it can be exceedingly difficult to find a local web around a place without an efficient, intelligent local discovery system.

Embodiments disclosed herein do not attempt to crawl the entire Web. Rather, a goal is to crawl a "local web" around each place, metropolitan area, or other geographical space of interest. Each such a local web would include highly semantically connected media sources, blogs, and streams of local interest media mentions. Within this disclosure, "local content corpus" refers to a body of content particularly relevant to a local web with respect to a place, metropolitan area, or any geographical space of interest.

Within this disclosure, a place can be any named area where a user has a primary affiliation. For example, for cities a named area can be a neighborhood; whereas, for small towns, a named area can be a town or municipality itself. In order classify content relative to place, in some embodiments, the system can be built to enable near constant time classification of content. As will be further described below, this approach can be based on a local entity weighting approach for content classification.

The system allows self-edited content to be created from general content templates based on web crawling and machine learning algorithms. These content templates are based on likely interest areas and can be customized by the end-user. In this context, "self" refers to the system. Editing is the process of reviewing and then condensing, correcting or arranging written material, images, sound, video, or film with the objective of preparing it for final presentation. As an editor, the system uses its understanding of the audience to determine the best content for publication. The system approximates, simulates, and automates the editing process by discovering who publishes content locally, what is locally interesting to the local audience then generating, on an ongoing basis, streams of content based on the learned place interest.

The system also finds the relationships amongst data based on learning and/or finding common patterns of information in the content. The relationships amongst data enable content tapestries to be created which, in turn, enables a user to see content in its local context.

At this point, a few observations can be made:

Local content is local because of the "subjects" of the content. A subject of the content is a function of the entities (associated terms) that make up that content.

Local content is anchored around local people, places and things of interest. These subjects of interest tend to relatively constant and mainly oriented around local geography. Examples of local places of interest may include, but are not limited to: Local business, schools, parks, streets, churches, etc. Content that contains references to these features can be locally relevant and the content from an area tends to have references to other local subjects and links to other web pages with local subjects.

Given a large metropolitan area, the amount of content created within that given locality can be proportional to the density of the population.

Web content publication continues to grow rapidly.

Features that anchor content establish the place affinity for a given location.

Place affinity can vary broadly due to depending social, urban planning and historical.

The relevancy of local content can vary exponentially with the distance to the audience. For example, crime information can be extremely relevant in a 0.25-mile radius versus crime information about 5 miles away. Local content by its nature can become uninteresting outside its immediate local context.

Local content can be boundary sensitive in that boundaries of neighborhoods and places can play as an important role to content relevancy as the distance proximity.

Local content sources publish on irregular basis due to that fact the blogs and tweets about the local area are often done by authors as a side-hobby. Trying to base a content stream on any single source will not provide a regular enough content stream to be compelling for the user.

In some embodiments, the system may leverage enabling technologies. One example may be keyword search implementing a search algorithm. In computer science, a search algorithm, broadly speaking, is an algorithm for finding an item with specified properties among a collection of items. Another example may be geotagging. Geotagging is the process of adding geographical identification metadata to various media such as photographs, video, websites, SMS messages, or RSS feeds (described below) and is a form of geospatial metadata. This data usually consist of latitude and longitude coordinates, though they can also include altitude, bearing, distance, accuracy data, and place names. Geotagging is commonly used for photographs, giving geotagged photographs. The amount of geotagged data is growing due to the adoption of personal mobile devices.

In some embodiments, the system may leverage known standards, including Internet publication standards which have emerged to enable easy interchange of content between parties. One example is RSS (most commonly expanded as Really Simple Syndication) which is a family of web feed formats used to publish frequently updated works-such as blog entries, news headlines, audio, and video-in a standardized format. An RSS document (which can be called a "feed", "web feed", or "channel") includes full or summarized text, plus metadata such as publishing dates and authorship. Web feeds benefit publishers by letting them syndicate content automatically. They benefit readers who want to subscribe to timely updates from favored websites or to aggregate feeds from many sites into one place. RSS feeds can be read using software called an "RSS reader", "feed reader", or "aggregator", which can be web-based, desktop-based, or mobile-device-based. A standardized XML file format allows the information to be published once and viewed by many different programs. The user subscribes to a feed by entering into the reader the feed's URI or by clicking a feed icon in a web browser that initiates the subscription process.

In some embodiments, the system utilizes an indexing engine to build and index all the local content. Features of this indexing engine may include powerful full-text search, hit highlighting, faceted search, dynamic clustering, database integration, and rich document (e.g., Word, PDF, etc.) handling. Enabled by the indexing engine's distributed search and index replication functionality, the system can be highly scalable and can support virtually unlimited content queries.

Figure 3:
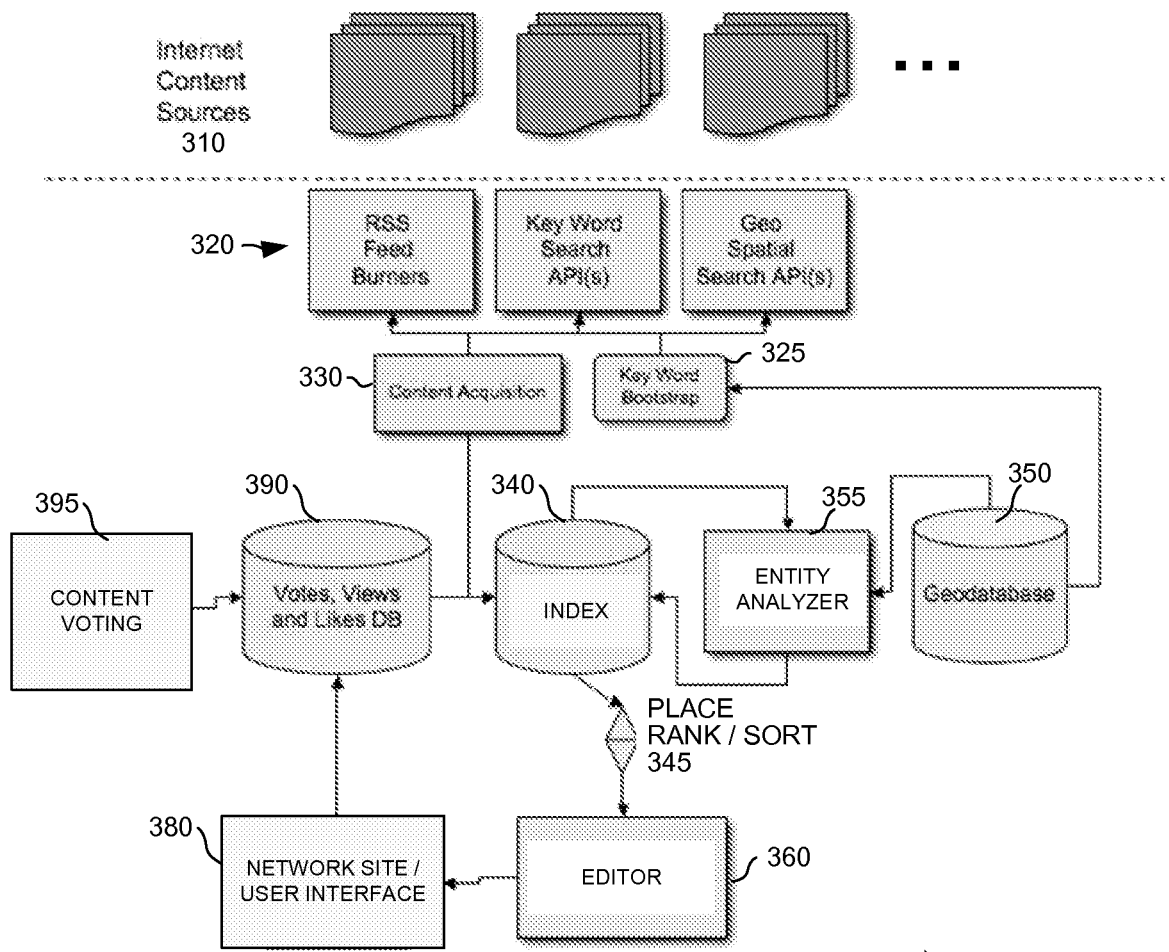
FIG. 3 depicts a diagrammatic representation of one example embodiment of a system architecture.

FIG. 3 depicts a diagrammatic representation of one example embodiment of a system architecture showing all the services required by the system. Each service in system 300 can be run as a stand-alone entity or as a separate process connecting through networked inter-process communication. Services in system 300 can be communicatively connected to Internet content sources 310 via application programming interfaces (APIs) 320. Content acquisition 330 and key word bootstrap 325 may operate on various contents obtained from Internet content sources 310 through APIs 320.

In one embodiment, key word bootstrap 325 may be configured to perform bootstrapping an initial set of terms for a place. Given any populated area, there exists a set of well-known geographic places. By using a geographic database (also referred to herein as a geodatabase), key word bootstrap 325 can automatically create a set of keyword search terms.

A geodatabase is a database designed to store, query, and manipulate geographic information and spatial data of low dimensionality. Within a spatial database, spatial data is treated as any other data type. Local entity weighting data can be stored and associated with geo point, line or polygon data types, and may have an associated spatial reference system. One primary advantage of spatial databases, over file-based data storage, is that a geographic information system (GIS) can be built on the existing capabilities of relational database management systems (RDBMS). This gives an otherwise standard database an ability to retrieve geospatial query terms and includes support for SQL and the ability to generate complex geospatial queries. Also, a database's client/server architecture supports multiple users simultaneously and lets them view, edit, and query the database without conflict.

A geodatabase record can use a geometry data type to represent the location of an object in the physical world and other standard database data types to store the object's associated attributes.

As an example, geodatabase 350 may contain state, municipality, macro area and neighborhood name data. Note, however, geography boundaries are not limited to any set of real-state boundaries. Boundaries can include any affiliation that exists as a function of user location. These boundaries include school districts, political, municipal zoning, etc. By leveraging these key word search terms based on key words based on boundaries and their name hierarchy and geo-spatial queries based on boundary polygons an initial content data stream to be created for a given set of boundaries.

In one embodiment, geodatabase 350 may hold a set of all geo-spatial polygons associated with places. This database also contains a place hierarchy. In one embodiment, geographic places can be arranged in the place hierarchy where each level represents a geographic level. For example, a U.S. address can be represented to reflect a geographic hierarchy for the purpose of efficient postal routing. More specifically, suppose a U.S. address is as follows:

1813 Clifford Ave
Austin, Tex. 78702
U.S.A.

The address starts with the street, which is the lowest level of a geographic hierarchy, followed by the city then the state and then the country. Oriented in a parent-to-child order the address would read:

U.S.A., TX, Austin, 1813 Clifford Ave

Figure 4:
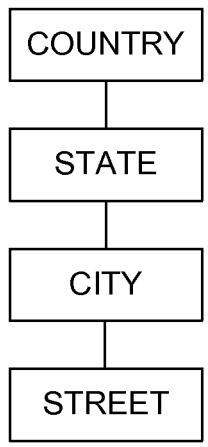
FIG. 4 depicts a diagrammatic representation of an example geographic hierarchy.

FIG. 4 depicts general hierarchy 400 representing this hierarchy as graph. This hierarchy represents a geographical containment hierarchy, where each level of the hierarchy contains the subsequent contained or child levels. These hierarchies are strictly partitioned where no geographic place overlaps any other within the same level of the hierarchy within a boundary class (real-estate, school district, city-political).

Figure 5A:
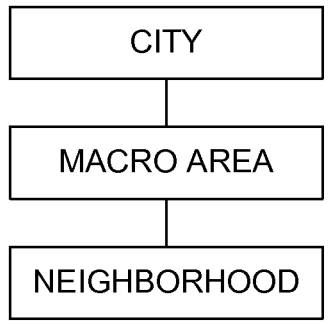
FIG. 5A depicts a diagrammatic representation of one embodiment of a local hierarchy.
Figure 5B:
FIG. 5B depicts an example of a local hierarchy that captures an neighborhood located in Austin, Tex.

Local geographies decompose further into areas oriented around neighborhoods in most metropolitan areas. These local geographies are mainly a function of real-estate boundaries and socio-economic factors that partition populations within cities. As such, this hierarchy encodes important social context that enable a reasonably targeted automated key word search to prime content acquisition. FIG. 5A depicts local hierarchy 500 and FIG. 5B depicts an example of local hierarchy 500 that captures a neighborhood located in Austin, Tex.

This hierarchy further qualifies where Rosewood neighborhood resides by providing the macro area, "East Side" as its parent. "East Side" refers to a section of Austin that is distinct from other sections of Austin.

In many cities, this macro-level decomposition reflects the compass directional (North, South East, West, etc.). However, many cities may have districts that exist due to real-estate development or area history.

The system can therefore be organized around places, each representing a named area where a user has a primary affiliation. For cities this can be the neighborhood and for small towns this can be the town or municipality itself. Place affiliation can be a key to enabling effective content acquisition. When a user provides the system with their address, the user is implicitly providing a rich context for the system to base automated content acquisition. In some embodiments, these places groups can be defined by local boundaries below the city level. The system can be designed to operate best in the most specific local context.

Currently, there is not a 100% reliable source for local boundaries (i.e., boundaries below the city level). In order to drive content acquisition efficacy, the system can be connected with local information sources to compile local boundary information for areas where the system is deployed.

Geodatabase 350 represents one example type of "a map of the world." There can be various types of maps of the world. For example, there can be a map of the world that map out all the highway systems of the world, all the air traffic patterns of the world, all the businesses in the world, all the people in the world, etc. These maps can be obtained from various sources. For example, OpenStreetMap is a collaborative project to create a free editable street map of the world.

Information contained in such a map of the world is often context free and not tied to any vendor. However, it can have all the names of the towns and streets and the geo information, all the vectors that make up all the towns, all the streets, and all the polygons. Based on the topology (hierarchy) of this map of the world, an initial heuristical filter can be built for a context free way of finding place names. For example, Tarrytown exists not only in Austin, Tex., but also in New York. In Austin, Tarrytown is a neighborhood located west of downtown Austin. In New York, Tarrytown is a village in the town of Greenburgh located on the eastern bank of the Hudson River. A heuristical filter can be built to traverse a hierarchy and find Tarrytown, Austin, Tex. or Tarrytown, Greenburgh, N.Y. if "Tarrytown" is mentioned in a piece of content.

Likewise, various heuristical filters can be built for a context free way of finding people, organizations, highway systems, etc. In this way, the system is provided with the ability to topologically from a language point of view performs an initial context free pass of finding place names. As another, a service such as Factual may provide business information that include the names of all or potentially all the businesses in the world, when do they open, where are they on the map, etc. Those skilled in the art will appreciate other types of information, many of which may be freely available on the Internet and/or provided by various agencies and organizations, can also be included. These different types of information can be inter-related or otherwise associated and persisted in a gazette of information.

The gazette can be implemented in a database of a set of indices. This database can be huge, perhaps on the order of at least one terabyte or more. When every country is loaded, it may be at least two terabyte large. For example, the highway system in the state of Texas along has 56 million entries.

Figure 6:
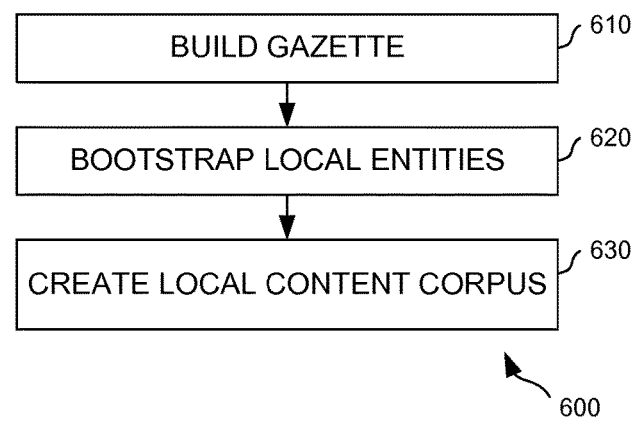
FIG. 6 depicts one embodiment of an example method for generating a local content corpus.

As illustrated in FIG. 6, after a gazette is built (step 610), the gazette can then be used in a bootstrap process to build these hierarchies (topological heuristics) with local entities (step 620) and start to qualify, at least initially, the information from these various sources into a local content corpus (step 630). Those skilled in the art will appreciate that method 600 is meant to be a non-limiting example and that additional steps may be included in method 600.

Figure 7:
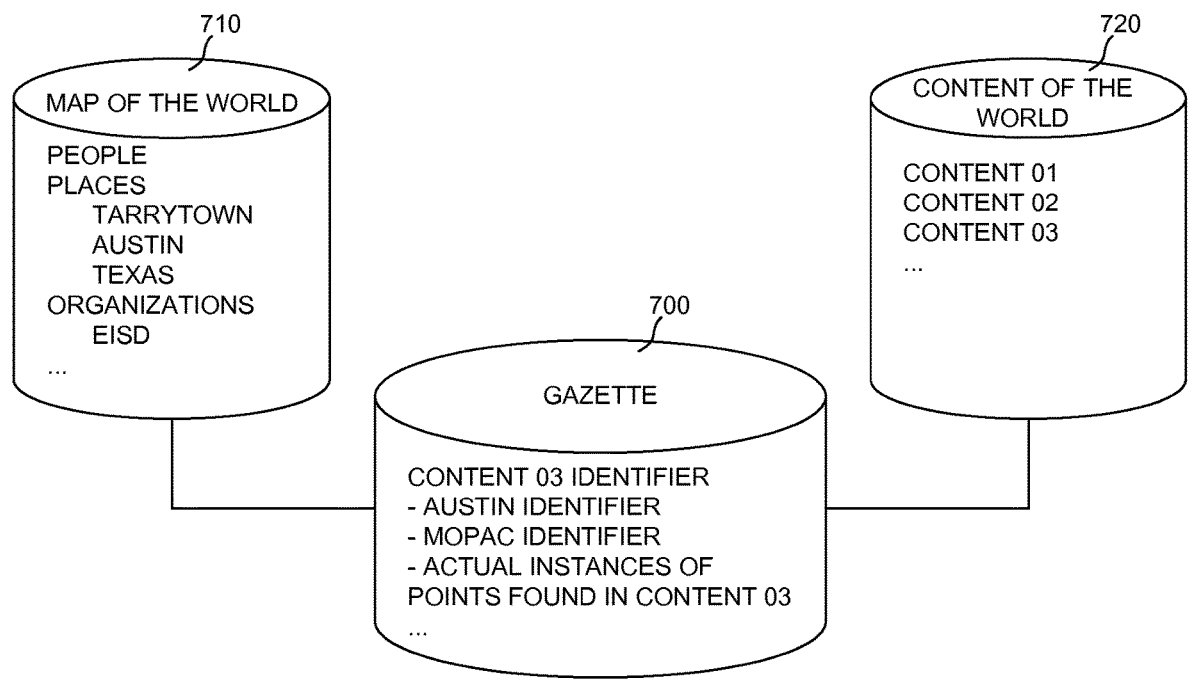
FIG. 7 depicts a diagrammatic representation of one embodiment of a gazette containing a set of indices referencing at least people, places, and organizations.

As illustrated in FIG. 7, gazette 700 can be created by correlating geo points found in map(s) of the world 710 with named entities found in content(s) of the world 720. In one embodiment, these may be implemented as databases. As an example, database 710 may contain information from various sources defining at least places, people, and organizations. Database 720 may contain content crawled from various sources. The sources for database 710 may be the same or different from the sources for database 720. In one embodiment, each place, person, and organization in database 710 is associated with a global identification (GUID) and each piece of content in database 720 is associated with a content ID. Terms extracted from a piece of content may be associated with a particular content ID. Database 700 may contain a set of indices referencing entries from databases 710, 720.

In this way, a spot on the globe (as defined by longitude and latitude) can be represented by a pin. Within this disclosure, a pin represents a geographic feature which can be either a point on a map or a polygon or a point in radius to a predefined resolution. An example of a point on the map may be a street corner at the intersection of Lamar Street and 25$^{th}$ Street, Austin, Tex. Within this disclosure, "polygon" refers to an area having dimensions. An example of a polygon may be Austin, Tex.

An initial local corpus for each such place (pin) can be created by bootstrapping local entities utilizing the gazette. An example process can comprise, for each place of interest, determining a list of information sources local to the place, crawling those information sources to obtain raw content, processing the raw content to obtain a first pass of named entities local to the place, and storing those local entities in a database. Non-limiting examples of places may include all major metropolitan areas, cities, or cluster of cities. Non-limiting examples of local information sources may include online local newspapers, blogs, city government websites, etc. RSS feeds may be a non-limiting example of raw content. Non-limiting examples of the first pass named entities may include people, place, and organization entities.

In one embodiment, the raw content or crawled information can be passed through a plurality of filters (produced out of the gazette) to look for mentions of names, business, places, contexts, etc. Some heuristic filters can be topological and some can be name oriented, place oriented, time oriented, and so on. These heuristics can be adapted for whatever references the system is configured to search and process.

As a specific example, the gazette can provide the system with the knowledge of what "Austin, Tex." is, allowing the system to orient any reference to "Austin, Tex." topologically. For example, an article on an online magazine may mention Austin, Tex., July 2010. Using a heuristic filter from the gazette, the system can narrow the focus to a particular part of the gazette (which, as discussed above, can be a huge database on the order of at least one terabyte) that is associated with "Austin, Tex.". As the system continues to find other mentions, references, utterances or other target entities in the content, heuristics associated with those mentions may further narrow the focus. This can provide a short cut in the computation of determining how relevant that article is with respect to "Austin, Tex.".

As another example, suppose "Tarrytown" is found in a piece of content, the system may find all entries in the gazette that pertain to "Tarrytown", including "Tarrytown, N.Y.", "Tarrytown, Austin, Tex.", "Tarrytown, Calif.", etc. Suppose "MoPac" is found in the same piece of content, the system may narrow the focus to "Tarrytown, Austin, Tex.", since Tarrytown in Austin, Tex. is most often defined as the area bounded by Enfield Road in the South, 35th Street in the North, MoPac Expressway in the East, and Lake Austin in the West, indicating a high likelihood that this piece of content is related to "Tarrytown, Austin, Tex.". This computation (essentially place classification) continues until all mentions or references in the piece of content have been processed to identify how likely this piece of content is local to "Tarrytown, Austin, Tex.".

Some raw content or crawled information may have geocodes. This is in part due to the increased presence of mobile devices such as smartphones in the online space and the ubiquity of tags on content. Term frequencies in particular localities can also be used to adjust the notion of place quality. A geocode provides geospatial coordinate—latitude, longitude, altitude—at a specific moment in time. Thus, some heuristics can be adapted to utilize geocodes to "vote off" terms found in the contents from the sources. For example, a blogger in City A may blog about a restaurant or food scene in City B. The content from this blogger may have a geocode for City A, but the content would be local to City B or even a particular neighborhood of City B. In this case, the geocode of this blogger's content may not be useful. However, if the preponderance of content weights a term a particular way, it can act as a collaborative vote on what is local, factoring in a variety of statistical measures including, for example, the Bayesian probability analysis.

In one embodiment, one or more curators may review qualified contents from steps 610 and 620 and ascribe the localness thereof. This can "tighten the fitting" on the data to remove false positives and provide a tighter fit.

Figure 8:
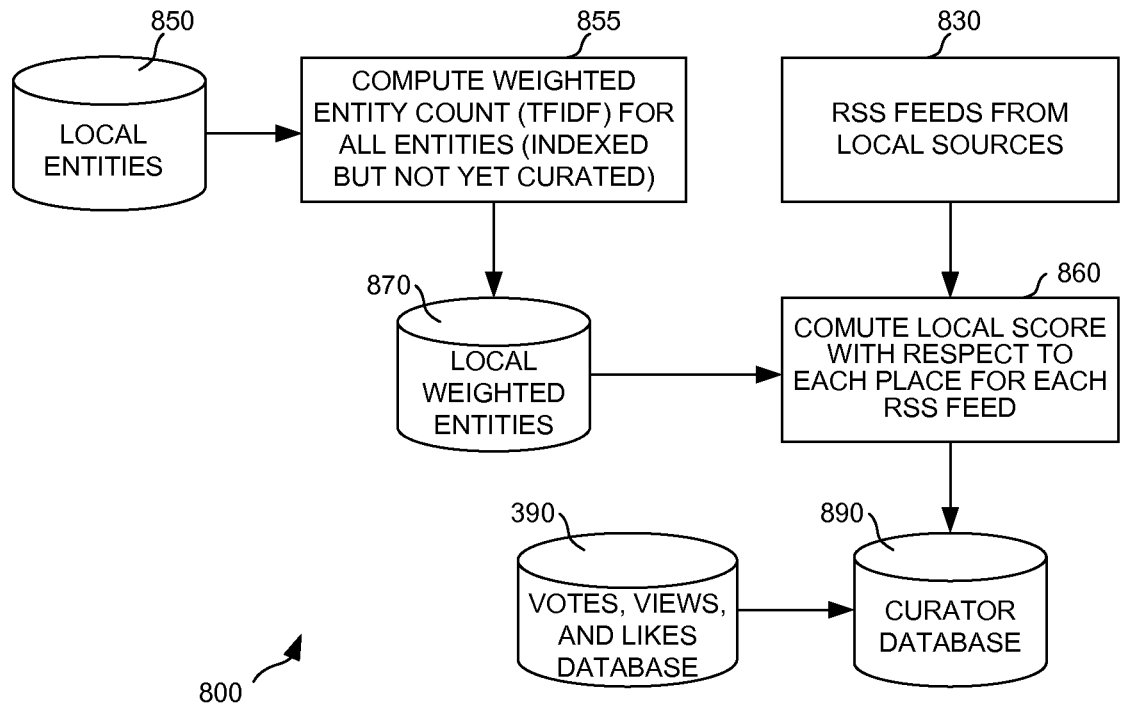
FIG. 8 depicts a diagrammatic representation of one embodiment of a semi-supervised training process for qualifying content into an initial local content corpus.

FIG. 8 depicts a diagrammatic representation of one embodiment of a semi-supervised training process for qualifying content into an initial local content corpus. In this example, process 800 comprises computing weighted entity count for all local entities from local entities database 850 (step 855). After the first pass described above, these local entities have been indexed but not yet curated to ensure that they are indeed local to a particular place. The local entities and their associated weights as persisted in local weighted entities database 870. On an ongoing basis, an editing function may obtain RSS feeds from local sources (step 830) and compute local score with respect to each place for each of the RSS feeds (step 860) and place additional content relative to each place (per local content corpus) in curator database 890.

In one embodiment, the system can be tested to ensure each local content corpus contains real local content. To test the system, a subset of content known to be relevant to a particular place may first be curated by local people. The subset of content may be passed through the heuristic filters described above to see how the system performs and how close the match is (between a human curated piece of content and another piece of content). This process leverages human experience of what constitutes "local". As will be described below, the system also provides a mechanism by which local people can vote on what is local. Such "votes" may end up affecting what constitutes "local". This bootstrapping produces a local content corpus. However, so far, the content in the local corpus has not yet been ranked—just separate contents from the sources between what would be considered as local and not.

Note what is "local" is relative. The heuristics define how "local" local is. Thus, in one embodiment, the system may define "local," then run content through the filters, and fit the content to what is defined as "local". For example, the system may define "local" means "Austin, Tex.", run the content through the filters, and fit the content to find what is local to Austin, Tex. In one embodiment, the system may comprise heuristics through which content can be passed through. The system may then determine a "local" to fit the content. For example, the system may process a set of documents and determine that "local" with respect to the set of documents means "Austin" or "Texas".

In this way, for every place in the world, the system can take a document and end up with two outputs: one is a set of points in polygons that are either directly or indirectly mentioned in the document and also a set of weightings about the terms from the document.

Note that the same document can be relevant to more than one local content corpus—the bootstrap process is not a singular process and, depending upon the desired resolution, there can be overlapping content between local content corpora.

Notice also the system is not looking at any particular place, but all of the places in the gazette, including "Tarrytown" in NY, TX, CA, etc. Each "Tarrytown" is a spot on the map of the world. The system finds every article ever mentioned Tarrytown and may climb up and down the hierarchy (topology). Depending upon a configurable resolution setting, the system can be implemented to go down to neighborhood, city, county, etc. or as far down as one desires. One way to adjust the resolution is by adjusting the weights associated with the named entities. In one embodiment, content can only resolve down to U.S. Anything less is eliminated as it is not "local" to any interested target. The desired level of resolution may depend on city density. For example, San Francisco has high city density and therefore may need to resolve down to the neighborhood level in order to have locality sensitivity. Again, this can be configurable and may vary from implementation to implementation.

In one embodiment, by applying the following algorithm an initial set of "bootstrap" content can be generated. The content is referred to as "bootstrap" as it requires no a priori knowledge of an area, other than local geographic hierarchy.

EXAMPLE Geo-place key word generation algorithm:

---

∀(ρ): ρ is a place group {ρ ∈ place groups below the city level}
    visit(ρ)
    let keyword search terms =
        concat(name(ρ), name(macro(ρ)), name(city(ρ))
    where ρ is a place group in the geo hierarchy
    where visit⇒
        traversal through the geo-hierarchy to ρ
        with ρ: {attributes of v: name level parent, children}
    where concat ($a_0, a_1 .. a_n$) ⇒ string concatenation of $a_0, a_1 .. a_n$
    where macro(ρ)⇒ the macro area group containing ρ
    where city(ρ)⇒ the city or municipality group containing ρ

---

With this initial set of local search terms, a set of keyword searches can be generated automatically for any place. These initial terms enable a bootstrap content stream to be created for any given place where the system is deployed.

Key word searches based on this algorithm enable an initial set of priming content (or corpus) to be created for the system. This priming content establishes the initial body of content that the system will use to begin to baseline content relevancy. The system leverages Bayesian probability that local content for a place will have local entities with a higher relative probability.

To generate a local corpus, the system first generates local content streams from each of the top-level content data sources and aggregators using the bootstrap keyword search terms. Place-based keyword search and geo-spatial search based on local boundaries allow the system to build up, for each place in the system, a body of content relative to the place (place corpus).

This place corpus provides the system with an importance of "local terms" (local entities) associated with a given place relative to the entire body outside a given local area. This importance can be determined using TFIDF (term frequency-inverse document frequency) weighting. The TFIDF weight is a statistical measure used to evaluate how important a word is to a document in a collection or corpus and can be used in information retrieval and text mining. The importance increases proportionally to the number of times a word appears in the document, but is offset by the frequency of the word in the corpus. One example of TFIDF weighting algorithm is as follows:

---

∀(ρ): ρ is a place group {ρ ∈ place groups below the city level}
    ∀(cs): {cs: content source providing key word search}
    let content stream of ρ = keyword search (cs, keywords of ρ)
    ∀(t): {t: term in content stream − {st: stop words}} let tf(t) = $tf_{i,j} = \dfrac{n_{i,j}}{\sum_k n_{k,j}}$ with
|D|: cardinality of D, or the total number of documents in the place corpus; and
|{d:$t_i$ ∈ d}|: number of documents where the term $t_i$ appears (that is $n_{i,j}$ ≠ 0). If the term is not in the corpus, this will lead to a division-by-zero. It is therefore common to use
1 + |{d:$t_i$ ∈ d}|
Then
$(tf\text{-}idf)_{i,j} = tf_{i,j} \times idf_i$
where ρ is a place group in the geo hierarchy.

---

By using TFIDF weighting, two documents can be considered to be semantically related through their geography dimension if, in one embodiment, the people, places and organizations tagged by a semantic tagger occur more frequently in the content for a given place.

The inverse document frequency is a measure of whether the term is common or rare across all documents. It is obtained by dividing the total number of documents by the number of documents containing the term, and then taking the logarithm of that quotient.

$$idf(t, D) = \log \dfrac{|D|}{|\{d \in D : t \in d\}|}$$

with
|D|: cardinality of D, or the total number of documents in the corpus; and
|{d∈D:t∈d}|: number of documents where the term t appears (i.e., tf(t,d)≠0). If the term is not in the corpus, this will lead to a division-by-zero. It is therefore common to adjust the formula to 1+|{d∈D:t∈d}|.

Mathematically, the base of the log function does not matter and constitutes a constant multiplicative factor towards the overall result. Then the tf*idf is calculated as tf*idf(t,d,D)=tf(t,d)×idf(t,D). In one embodiment, people, places and organizations can be used as terms plugged into the above functions as t.

In order to classify content relative to place, the system enables near constant time O(1) automated classification of content. This approach is based on a local entity weighting model approach for content classification. In system 300, this is implemented in entity analyzer 355.

Document classification/categorization is a general problem in information science. The task is to assign an electronic document to one or more categories, based on its contents. Document classification tasks can be divided into two sorts: supervised document classification where some external mechanism (such as human feedback) provides information on the correct classification for documents, and unsupervised document classification, where the classification must be done entirely without reference to external information. There is also a semi-supervised document classification, where parts of the documents are labeled by the external mechanism. In one embodiment, the system is supervised and semi-supervised where content is tagged by both internal content voting, external input from users and existing reference tagged corpus for named entity recognition.

Various local entity weighting models may be used. Suitable examples can be found in the above-referenced U.S. patent application entitled, "SYSTEM, METHOD, AND COMPUTER PROGRAM PRODUCT FOR AUTOMATED DISCOVERY, CURATION AND EDITING OF ONLINE LOCAL CONTENT," which is incorporated herein by reference.

Now that the system has local content corpora (each representing a body of content that is local to a place), the system uses an indexing engine to build and index all the local content. One example indexing engine is Elastic Search, a distributed open source search server that supports the near real-time search of Apache Lucene. Elastic Search can index data using JavaScript Object Notation (JSON) over HyperText Transport Protocol (HTTP).

JSON is a text format that is completely language independent but uses conventions that are familiar to programmers of the C-family of languages, including C, C++, C#, Java, JavaScript, Perl, Python, and many others. Provide an index name, a type and an identifier of a typed JSON document to Elastic Search and it will automatically perform indexing using a unique identifier at the type level and return the actual JSON document used to index the specific data. Each index in index database 340 can have its own settings which can override the master settings. One index can be configured with a particular memory storage and have multiple (1 . . . n) shards with 1 replica each, and another index can have a file based storage with 1 shard and multiple replicas. All the index level settings can be controlled when creating an index using a JSON format.

Other suitable distributed search and index platforms may also be used, for example, Apache Solr, which is an open source enterprise search platform from the Apache Lucene project. The system therefore can leverage features of Apache Lucene which include powerful full-text search, hit highlighting, faceted search, dynamic clustering, database integration, and rich document (e.g., Word, PDF) handling. Both Elastic Search and Solr architectures enable "wide-scaling" of the indexing system to support virtually unlimited content queries.

These indexing engines enable the system to implement a customized neighborhood content ranking algorithm that determines the relevancy of documents contained in the index relative to a geo place.

To reflect use bias to most local content, the system may implement a rank-boosting algorithm based on content geotagging. Only a small percentage (e.g., ~5%) of content found on the Internet is "hard tagged" with an originating location encoded as latitude and longitude using the standard geo microformats. Due to the low occurrence of hard geotagging, local boosting is a function of both local relevancy score by document classification and geotag data when available. This allows content to be soft geotagged by using the local entity weighting classifier when no geotag is available for the content.

The boosting algorithm can be integrated into the indexing engine by implementing a custom ranking query, one example of which is as follows:
P=probability that a story is in a given place, as determined by local entity weighting, where $$0<=P<=1$$

S=specificity of the place (low for large areas, high for small areas) where $$0<=S<=1$$

Thus, $0<=SP<=1$ and SP gives us a measure of how likely it is that the story is locally relevant.

The bigger SP is, the more locally relevant the story is likely to be. The ranking function must work with hard geotagged data when soft geotagged data is not present. This gives the soft geotagged data equal footing with the hard geocoding, which is useful since all pages will have soft geotagged data while only a small percent will have hard geotagged data.

If there is no hard geotagged data, let L=0.25 (arbitrary). Otherwise, use previously calculated value of L:

$$L=L'[2*(1-SP)]$$

With a content index in place and an initial base line of local entity weights by place, the system can enable targeted web crawling for additional local content. The system may process the acquired content as described above and fine tune each local content corpus. Index 340 can be updated to include additional content with local relevancy with respect to each local content corpus. As will be described further below, the system may also conduct supervised and/or semi-supervised content curation for each local content corpus and self-edit content in the local content corpus.

To enable the ongoing content polling, in one embodiment, the system utilizes an open source crawler such as Nutch. The crawler can enable the system to crawl links from local content and keyword search and score newly discovered content through local entity weighting and other customized criteria as links are crawled. This creates a targeted optimized web-crawler for every place in the system. This web crawler uses a place's "local taste" encoded in the place's entity weights to find content that place would likely find interesting.

As discussed above, the crawler can also monitor content sources on an ongoing basis to determine if there are any updates, which enables large volumes of websites to be watched on a frequent basis. Once the system finds a "good" local source of content for a place, that local source will be continuously monitored for updates and those updates are placed into the local content index (e.g., index 340), stored in the indexing engine. The crawler's continuous monitoring allows a set of frequently updated content streams to be created from a set of low frequency, infrequently published sources.

Once content is acquired and indexed, product management or team of authorized users can selectively categorize content based on target content categories, utilizing a voting application. These categorization votes can be stored and factored in a post-processing process (not shown). Curator(s) can vote on a current place's publication and the top of local content index 340 for a given place.

As an example, classifications may include neighborly (content reflecting 'local flavor'), spam, sports, crime and other interest related categories. Curator(s) can add and remove categories based on editorial judgment. These classifications can be arbitrary and can be combined with one another through logical composition.

Votes can associate entity weights with a particular classification and update existing entity weights that are used to automatically classify new documents.

Further, category classification votes can be augmented based on user clicks to update the weights of each of the categories. For example and also referring to FIG. 3, if a user clicks through a categorized content item based on category and does not page-bounce from that item, this viewing (content voting 395) can ascribe a weighted acceptance of a content's categorization. This value is weighted due to the uncertainty in the information the viewing ascribes. Votes, views, and "likes" may be stored in database 390 accessible by the indexing engine described above.

Over time, as the system runs and more clicks and more votes are collected the categories and entity weight histories capture the place relative categorization. These categories are place-relative due to the fact the entity weights vary from place-to-place and reflect a place's tendency to contain local entities. With these entity weights in place, any content can be scored for "place affinity" for any place in the system.

Using with the local content index and automated content categorization based on local entity weighting, an automated editing process can be created.

Figure 9:
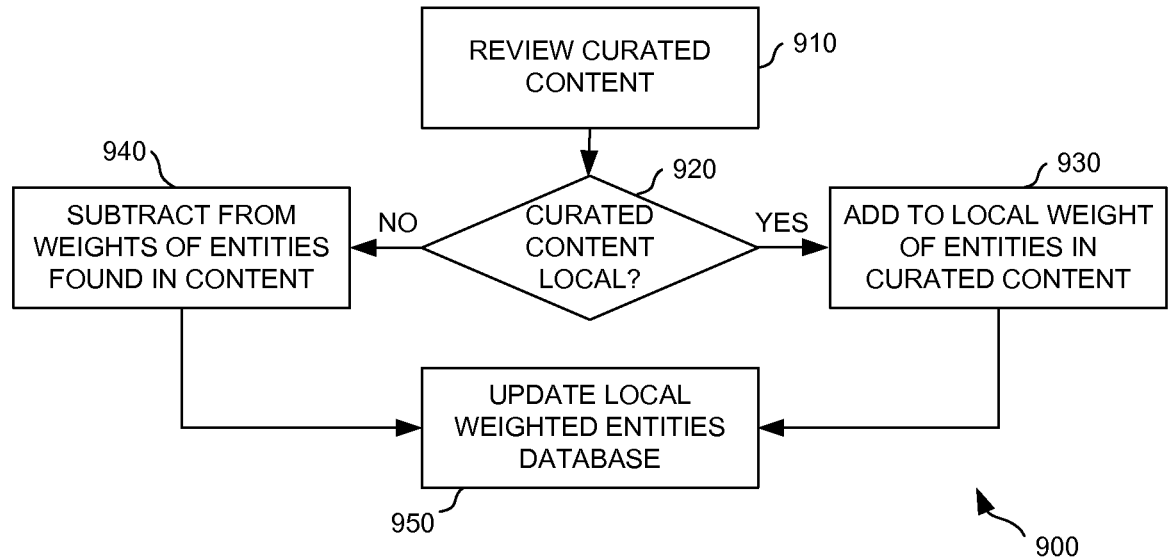
FIG. 9 depicts a diagrammatic representation of one embodiment of a supervised learning process for fine-tuning the local content corpus.

FIG. 9 depicts a diagrammatic representation of an example of a supervised learning process which draws from content in the index based on editing targets and optimizing based on "best available" content and content mixes. As an example and also referring to FIG. 3, automated editing function or editor 360 may operate to review a curated piece of content (step 910), perhaps with place ranking data 345, and determine whether that content is local to a certain place (step 920). If so, the system may add to the local weight of entities in the curated content (step 930). If not, the system may subtract from the weights of entities found in the curated document (step 940). Database 870 is then updated to reflect any adjustment made to the local weighted entities (step 950).

Content mixes can enable editing targets to reflect available content. This can be useful with respect to density in various places. For example, urban centers often have a high amount of social content like Twitter and there are large numbers of places of interest, which anchor content streams. By contrast, suburban communities have sparser content streams driven by occasional posts from fixed content sources. An optimization goal for the automated editor is to drive regular updates to each content stream as available content allows.

In one embodiment, an automated editing process pulls from the content index and applies a customized collection algorithm based on content mix type. The collection algorithm pulls from the index creating a rotation of content based on geographic and content categories. An example editing algorithm is provided below:

```
Set the editing target of 10 articles, with a mix of
interest types not over representing a content source
within the stream.
Let filled(publication) : {true, false} where true
when meeting content targets, by category, source
attenuation, content type adjacency and length of
overall publication
∀(ρ): ρ is a place group {ρ ∈ place groups with active
users}
    while not filled(publication)
        ∀(level) : { l ∈ {neighborhood(p), macro(p),
        city(p)} }
            pull from local content index (level(p))
            apply editing targets, trimming (publication),
            push onto discard-queue
            re-check editing targets pulling from local
            content parent(level(p))
```

The editing algorithm climbs the place hierarchy to meet content targets. This allows the system to optimize for the most local relevant content available by each of the content categories. Other suitable editing algorithms may also be implemented.

The system's knowledge increases with each pass, strengthening the system's ability to dynamically rank local content that is highly relevant to a particular place and/or local favor. Each place added in the geodatabase may also increase the system's ability to further distinguish local entities.

Figure 10:
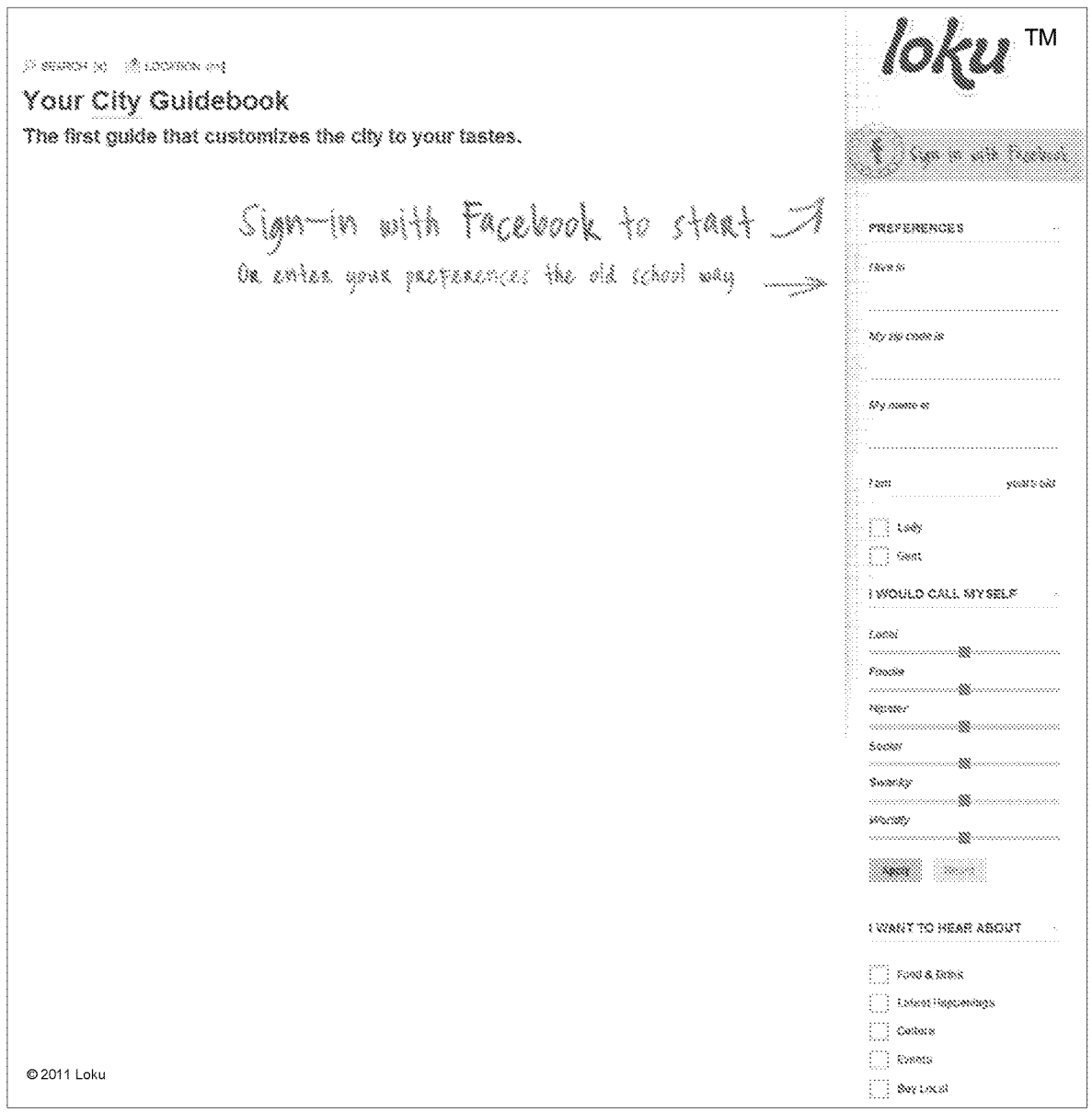
FIG. 10 a diagrammatic representation of an example user interface of a network site implementing an embodiment of the system disclosed herein.
Figure 11:
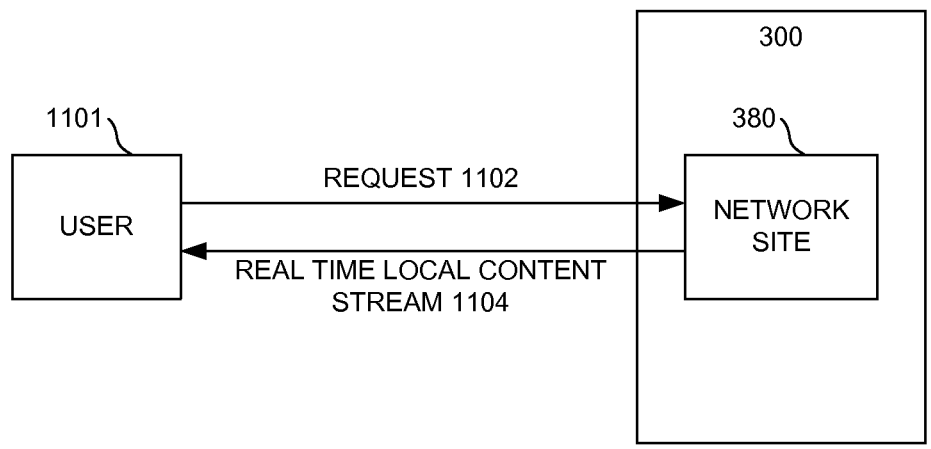
FIG. 11 a diagrammatic representation of a network communication between a user device and the network site, the system providing a user through the network site local content highly relevant to a place and/or subject of interest to the user.

FIG. 10 depicts a diagrammatic representation of an example user interface (UI) of a network site implementing an embodiment of the system disclosed herein. FIG. 11 a diagrammatic representation of a network communication between a user device and the network site, the system providing a user through the network site local content highly relevant to a place and/or subject of interest to the user. Referring to FIGS. 3, 10, and 11, UI 1000 may provide user 1101 with access to network site 380. In response to a request about a particular place, system 300 may form a query to index 340. In the example of FIG. 11, request 1102 is sent from a client device connected to system 300 which may have one or more server machines.

As a specific example, in causing request 1102 to be sent, user 1101 may not need to proactively do anything other than opening an application. If user 1101 is using a mobile device, this may be as simple as opening a mobile app. The mobile app knows the location through internal GPS and time. The mobile app may comprise client software of system 300, the client software capable of forming a query to search index 340 that essentially asks: "What is the most local place to eat or piece of news content at this time and place." An example input (in JSON) to the search index is as follows:

```
{ document:<body text> // extracted to include only the
body of article
    pins: [{lat,lng}, {lat,lng}, {lat,lng} ... ] // All
geolocated references in document
    dates: [date1, date2, date3...] // All dates extracted
though date parsing process
    entities: [ner1, ner2, ner3...]} // All exrtacted NER
from corenlp}
```

As this example illustrates, the input may include features extracted by the system.

Figure 12:
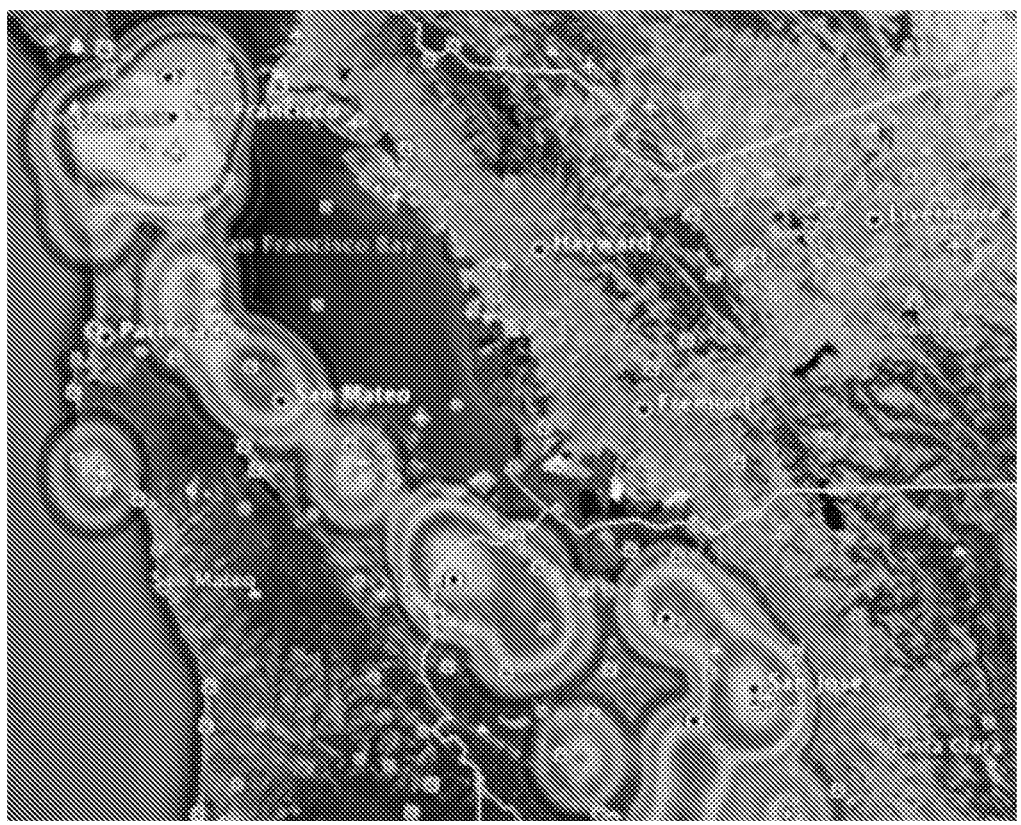
FIG. 12 depicts a "thermal" image showing the most relevant, per real-time ranking, news articles from the local content corpus associated with a place.

In response, system 300 returns at least one stream 1104 of "most relevant" news articles and places to go at that time. Stream 1104 may be presented to the user in various ways. As a specific example, suppose the user is in the Bay Area, opening an app implementing an embodiment disclosed herein may cause a client device running the app to display stream 1104 as a "thermal" image or media showing the most relevant (white hot) news articles and places to go in the Bay Area, as illustrated in FIG. 12. Local content relevant to the Bay Area may also be presented using a pinned map with each pin representing a geographic feature which can be either a point on the map (a street corner between Bay Street and Columbus Avenue in San Francisco, Calif.) or a polygon (San Jose, Calif.). Other ways to present local content relevant to a place may also be possible.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, touch pad, etc.), or the like.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A computer-implemented method, comprising:
   for each document in an initial local content corpus, the content corpus comprising a plurality of documents, each document comprised of raw content, applying a first set of heuristic filters to the raw content of each document;
   identifying, based on the application of the first set of heuristic filters, at least a second term;
   applying a second set of heuristic filters to the raw content of each document, the second set of heuristic filters associated with the second term;
   iteratively performing the identification of additional terms and application of an additional set of heuristic filters associated with the additional terms until each identifiable term is extracted;
   determining a level on a geographic containment hierarchy indicative of a location to which each document from the set of documents is local, the level on the geographic containment hierarchy to which each document is determined to be local being dependent on a configurable resolution setting; and
   for each place in a gazette, and for each document in the set of documents, determining a set of points in polygons indicative of its locality.

2. The computer-implemented method according to claim 1, wherein the iterative performance of the identification of additional terms and the application of the additional set of heuristic filters associated with the additional terms is configured to generate a set of local terms referencing at least people, places, and organizations.

3. The computer-implemented method according to claim 1, further comprising:
   determining a presence of geospatial information within a particular document; and
   utilizing the geospatial information in conjunction with particular term frequencies to determine to eliminate the document from the initial local content corpus.

4. The computer-implemented method according to claim 1, further comprising:
   for each place in the gazette, generating the initial set of local terms, generating the initial set of local terms comprising: accessing a document, and calculating an initial weighting for at least a portion of the initial set of local terms; and
   creating the initial local content corpus utilizing the initial set of local terms, the initial local content corpus containing documents that are semantically related to each other with respect to the place, the local content corpus configured for providing the system with relevant and unranked documents.

5. The computer-implemented method according to claim 1, further comprising:

for each place in a gazette, and for each document in the set of documents, determine a set of weightings associated with the terms in the document.

6. The computer-implemented method according to claim 1, wherein the first set of heuristics comprises at least a topological filter with respect to the place.

7. The computer-implemented method according to claim 1, further comprising:
obtaining the content from a plurality of disparate sources.

8. A computer program product comprising at least one non-transitory computer readable medium storing instructions translatable by one or more server machines to perform:
for each document in an initial local content corpus, the content corpus comprising a plurality of documents, each document comprised of raw content, apply a first set of heuristic filters to the raw content of each document;
identify, based on the application of the first set of heuristic filters, at least a second term;
apply a second set of heuristic filters to the raw content of each document, the second set of heuristic filters associated with the second term;
iteratively perform the identification of additional terms and application of an additional set of heuristic filters associated with the additional terms until each identifiable term is extracted;
determine a level on a geographic containment hierarchy indicative of a location to which each document from the set of documents is local, the level on the geographic containment hierarchy to which each document is determined to be local being dependent on a configurable resolution setting; and
for each place in a gazette, and for each document in the set of documents, determine a set of points in polygons indicative of its locality.

9. The computer program product according to claim 8, wherein the iterative performance of the identification of additional terms and the application of the additional set of heuristic filters associated with the additional terms is configured to generate a set of local terms referencing at least people, places, and organizations.

10. The computer program product according to claim 8, wherein the instructions are further translatable by the one or more server machines to perform:
determining a presence of geospatial information within a particular document; and
utilizing the geospatial information in conjunction with particular term frequencies to determine to eliminate the document from the initial local content corpus.

11. The computer program product according to claim 8, wherein the instructions are further translatable by the one or more server machines to perform:
for each place in the gazette, generating the initial set of local terms, generating the initial set of local terms comprising: accessing a document, and calculating an initial weighting for at least a portion of the initial set of local terms; and
creating the initial local content corpus utilizing the initial set of local terms, the initial local content corpus containing documents that are semantically related to each other with respect to the place, the local content corpus configured for providing the system with relevant and unranked documents.

12. The computer program product according to claim 8, wherein the instructions are further translatable by the one or more server machines to perform:
for each place in a gazette, and for each document in the set of documents, determine a set of weightings associated with the terms in the document.

13. The computer program product according to claim 8, wherein the first set of heuristics comprises at least a topological filter with respect to the place.

14. The computer program product according to claim 8, wherein the instructions are further translatable by the one or more server machines to perform:
obtaining the content from a plurality of disparate sources.

15. A system, comprising:
one or more server machines; and
at least one non-transitory computer readable medium storing instructions translatable by the one or more server machines to perform:
for each document in an initial local content corpus, the content corpus comprising a plurality of documents, each document comprised of raw content, apply a first set of heuristic filters to the raw content of each document;
identify, based on the application of the first set of heuristic filters, at least a second term;
apply a second set of heuristic filters to the raw content of each document, the second set of heuristic filters associated with the second term;
iteratively perform the identification of additional terms and application of an additional set of heuristic filters associated with the additional terms until each identifiable term is extracted;
determine a level on a geographic containment hierarchy indicative of a location to which each document from the set of documents is local, the level on the geographic containment hierarchy to which each document is determined to be local being dependent on a configurable resolution setting; and
for each place in a gazette, and for each document in the set of documents, determine a set of points in polygons indicative of its locality.

16. The system according to claim 15, wherein the iterative performance of the identification of additional terms and the application of the additional set of heuristic filters associated with the additional terms is configured to generate a set of local terms referencing at least people, places, and organizations.

17. The system according to claim 15, wherein the instructions are further translatable by the one or more server machines to perform:
determining a presence of geospatial information within a particular document; and
utilizing the geospatial information in conjunction with particular term frequencies to determine to eliminate the document from the initial local content corpus.

18. The system according to claim 15, wherein the instructions are further translatable by the one or more server machines to perform:
for each place in the gazette, generating the initial set of local terms, generating the initial set of local terms comprising: accessing a document, and calculating an initial weighting for at least a portion of the initial set of local terms; and
creating the initial local content corpus utilizing the initial set of local terms, the initial local content corpus containing documents that are semantically related to each other with respect to the place, the local content corpus configured for providing the system with relevant and unranked documents.

19. The system according to claim 15, wherein the instructions are further translatable by the one or more server machines to perform:
for each place in a gazette, and for each document in the set of documents, determine a set of weightings associated with the terms in the document.

20. The system according to claim 15, wherein the first set of heuristics comprises at least a topological filter with respect to the place.

* * * * *